(12) United States Patent
Watanabe et al.

(10) Patent No.: US 9,664,820 B2
(45) Date of Patent: *May 30, 2017

(54) METHOD FOR MANUFACTURING OPTICAL LENS

(71) Applicant: HOYA CORPORATION, Shinjuku-ku, Tokyo (JP)

(72) Inventors: Makoto Watanabe, Tokyo (JP); Daisuke Sato, Tokyo (JP); Akira Shimada, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/423,888

(22) PCT Filed: Sep. 2, 2013

(86) PCT No.: PCT/JP2013/073502
§ 371 (c)(1),
(2) Date: Feb. 25, 2015

(87) PCT Pub. No.: WO2014/034927
PCT Pub. Date: Mar. 6, 2014

(65) Prior Publication Data
US 2015/0219802 A1 Aug. 6, 2015

(30) Foreign Application Priority Data

Aug. 31, 2012 (JP) .................................. 2012-191876

(51) Int. Cl.
*G02B 3/00* (2006.01)
*G02B 1/10* (2015.01)
(Continued)

(52) U.S. Cl.
CPC .......... *G02B 3/00* (2013.01); *B29D 11/00865* (2013.01); *G02B 1/10* (2013.01);
(Continued)

(58) Field of Classification Search
CPC ............... G02B 1/10–1/18; G02B 1/14; G02B 3/00–3/14; G02C 7/02–7/028; B05D 1/02; B05D 1/002
(Continued)

(56) References Cited

U.S. PATENT DOCUMENTS 5,718,849 A * 2/1998 Maus ................... B29C 37/0007
264/2.2
5,766,354 A * 6/1998 Ohmori ................... B05C 11/08
118/319
(Continued)

FOREIGN PATENT DOCUMENTS

JP H06-246220 A 9/1994
JP 2001-264514 A 9/2001
(Continued)

OTHER PUBLICATIONS

Translation of Dec. 3, 2013 International Search Report issued in International Patent Application No. PCT/JP2013/073502.
(Continued)

*Primary Examiner* — Alex A Rolland
(74) *Attorney, Agent, or Firm* — Oliff PLC

(57) ABSTRACT

Method for manufacturing an optical lens in which coating solution curing conditions are satisfied and a coating solution is cured. The coating solution curing conditions include the angle of the axis of an optical lens substrate with respect to the horizontal direction falls within a predetermined angle range, and a second condition that the optical lens substrate rotates around the axis at a predetermined rotational speed. The predetermined angle range is between a maximum inclination angle of the axis at which the peripheral edge of a lens surface is positioned at the highest position of the lens surface, and a maximum inclination angle of the axis at which the peripheral edge of the lens surface is positioned at the lowest position of the lens surface. The predetermined
(Continued)

rotational speed is a speed at which the coating solution applied to the lens surface is held in a coating position.

12 Claims, 9 Drawing Sheets

(51) Int. Cl.
| | | |
|---|---|---|
| *G02B 1/14* | (2015.01) | |
| *B29D 11/00* | (2006.01) | |
| *B05D 1/00* | (2006.01) | |
| *B05D 1/02* | (2006.01) | |
| *G02C 7/02* | (2006.01) | |

(52) U.S. Cl.
CPC ............... *G02B 1/14* (2015.01); *B05D 1/002* (2013.01); *B05D 1/02* (2013.01); *B05D 2201/00* (2013.01); *G02B 1/105* (2013.01); *G02C 7/02* (2013.01)

(58) Field of Classification Search
USPC .............................. 427/168, 240, 372.2, 425
See application file for complete search history.

(56) References Cited

U.S. PATENT DOCUMENTS

| | | | | |
|---|---|---|---|---|
| 6,352,747 | B1* | 3/2002 | Blackburn | ............... G02B 1/10 118/320 |
| 2002/0041929 | A1* | 4/2002 | Magne | ................ B05B 13/0228 427/240 |

FOREIGN PATENT DOCUMENTS

| | | |
|---|---|---|
| JP | 2001327908 A | 11/2001 |
| JP | 2004122115 A | 4/2004 |
| JP | 2005013873 A | 1/2005 |
| JP | 2009285978 A | 12/2009 |

OTHER PUBLICATIONS

Apr. 13, 2016 extended European Search Report issued in Application No. 13832214.4.

* cited by examiner

METHOD FOR MANUFACTURING OPTICAL LENS

TECHNICAL FIELD

The present invention relates to a method for manufacturing an optical lens, in which a coating solution is cured while an optical lens substrate coated with the coating solution is rotated longitudinally.

BACKGROUND ART

A plastic spectacle lens, which is one of optical lenses, is provided with performance requested of the spectacle lens by performing various coating processes on its surface. These coating processes include a primer process, a process of forming a hard coat film, and a process of forming an antireflection film.

A primer film formed by the primer process has a function of adding performance including shock resistance, adhesion, and crack mitigation using softness. A hard coat film needs to be very hard in order to improve scratch resistance. An outermost layer serving as the outer surface of the hard coat film is provided with an antireflection film. By arranging the antireflection film on the outermost layer, performance including the antireflection function, durability, and scratch resistance is further added.

A primer layer at the time of the primer process and a hard coat layer serving as a hard coat film are formed by applying a coating solution to a lens surface. As a method of applying a coating solution to a lens surface, there are a dipping method, a spin coat method, a spray coat method, and an inkjet method as disclosed in patent literature 1. Application of a coating solution by the inkjet method disclosed in patent literature 1 is performed so that a spectacle lens substrate is rotated in a state in which the lens surface is directed vertically to uniform the film thickness on the entire lens surface.

The film thickness is uniformed by dividing the lens surface into a plurality of concentric coating regions, and adjusting the amount of coating solution for the respective coating regions. On the lens surface of a spectacle lens, interference fringes sometimes appear in a state in which various above-mentioned films are formed. It is known that the interference fringes are reduced by forming a thick hard coat film.

The coating solution applied to the lens surface is cured by a curing apparatus. A thermosetting coating solution is heated and cured by the curing apparatus. An ultraviolet curing coating solution is irradiated with ultraviolet rays and cured by the curing apparatus.

RELATED ART LITERATURE

Patent Literature

Patent Literature 1: Japanese Patent Laid-Open No. 2004-122115

DISCLOSURE OF INVENTION

Problem to be Solved by the Invention

The present inventor considers formation of a thicker hard coat film in order to improve the scratch resistance of a spectacle lens and reduce the generation of interference fringes mentioned above. However, it is difficult for the conventional dipping method and spin coat method to apply, to the lens surface, a coating solution for forming a hard coat film so as to have a thickness of 5 µm or more.

In contrast, the spray coat method and inkjet method can apply the coating solution to have a thickness of 10 µm or more. However, when the substrate is placed in a horizontal state, the coating solution applied to the lens surface of a spectacle lens substrate so as to have a thickness of more than 10 µm flows by the weight of the coating solution and gathers at lower portions (the peripheral portion of a convex curved surface 2a and the central portion of a concave curved surface 2b), which is so-called "dripping". Dripping is a phenomenon in which a coating film gradually flows by its own weight and gathers on the lower side of a curvature surface (the peripheral portion of a convex curved surface or the central portion of a concave curved surface). The dripping occurs immediately after application of a coating solution as long as the coating solution is fluid, and continues until the drying or curing of the film proceeds and the coating solution loses fluidity. When the coating solution is of a thermosetting type, if the temperature of the solution film rises during curing, the viscosity decreases and dripping occurs seriously. Even if the coating solution can be applied thick to have a uniform thickness, dripping occurs at the time of curing and may finally lead to a film thickness failure.

It is an object of the present invention to provide a method for manufacturing an optical lens, in which a coating solution applied thick to a lens surface can be cured without causing dripping.

Means of Solution to the Problem

To achieve this object, according to the present invention, there is provided a method for manufacturing an optical lens, comprising the steps of as a first curing condition, setting an angle of an axis of an optical lens substrate with respect to a horizontal direction within a predetermined angle range with reference to a convex surface side, as a second curing condition, rotating the optical lens substrate around the axis at a predetermined rotational speed at which a coating solution on a lens surface of the optical lens substrate is held in a coating position, and when the first curing condition and the second curing condition are satisfied, curing the coating solution applied to the lens surface of the optical lens substrate, the rotating step including a step of rotating the optical lens substrate within, as the predetermined angle range, a range between a maximum inclination angle of the axis at which a peripheral edge of the lens surface is positioned at the highest position of the lens surface of the optical lens substrate, and a maximum inclination angle of the axis at which the peripheral edge of the lens surface is positioned at the lowest position of the lens surface of the optical lens substrate.

Effect of the Invention

According to the present invention, the direction of gravity acting on a coating solution for an optical lens substrate in the curing step alternately changes between the central direction and peripheral direction of a lens along with rotation of the optical lens substrate. For this reason, the coating solution adhered to the rotating optical lens substrate does not flow in one direction though it is fluid. Since the influence of gravity, which is a prime factor of "dripping", can be canceled by longitudinal rotation of the optical lens substrate, "dripping" of the coating solution flowing along the lens surface does not occur. The present invention can therefore provide a method for manufacturing an optical lens, in which a coating solution applied thick to a lens surface can be cured without causing dripping.

BEST MODE FOR CARRYING OUT THE INVENTION

First Embodiment

An embodiment of a method for manufacturing an optical lens according to the present invention will now be described in detail with reference to FIGS. 1 to 5. A form in which the present invention is applied to a spectacle lens will be explained here.

Figure 1:
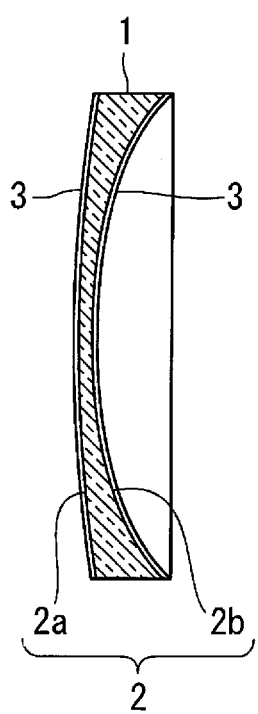
FIG. 1 is a sectional view showing a spectacle lens substrate on which a hard coat film is cured by a method for manufacturing a spectacle lens according to the first embodiment.

A method for manufacturing a spectacle lens according to this embodiment is a method for longitudinally rotating a spectacle lens substrate 1 shown in FIG. 1, and curing a coating solution 3 applied to a lens surface 2 (a convex curved surface 2a and a concave curved surface 2b). The method for manufacturing a spectacle lens according to this embodiment is a method constituting an invention described in claim 1. When executing this method, the substrate 1 on which the coating solution 3 is applied in advance to the lens surface 2 is used. The coating solution 3 is a general fluid coating solution such as a coating solution for forming a hard coat film or a coating solution for forming a photochronic film. The coating solution 3 in this embodiment is of a thermosetting type. However, the coating solution 3 may be of another type such as an ultraviolet curing type. The coating solution 3 is applied to the lens surface 2 to have a thickness of about 10 µm or more. For convenience, the coating solution 3 shown in FIG. 1 is illustrated to be thicker than it really is.

Figure 2:
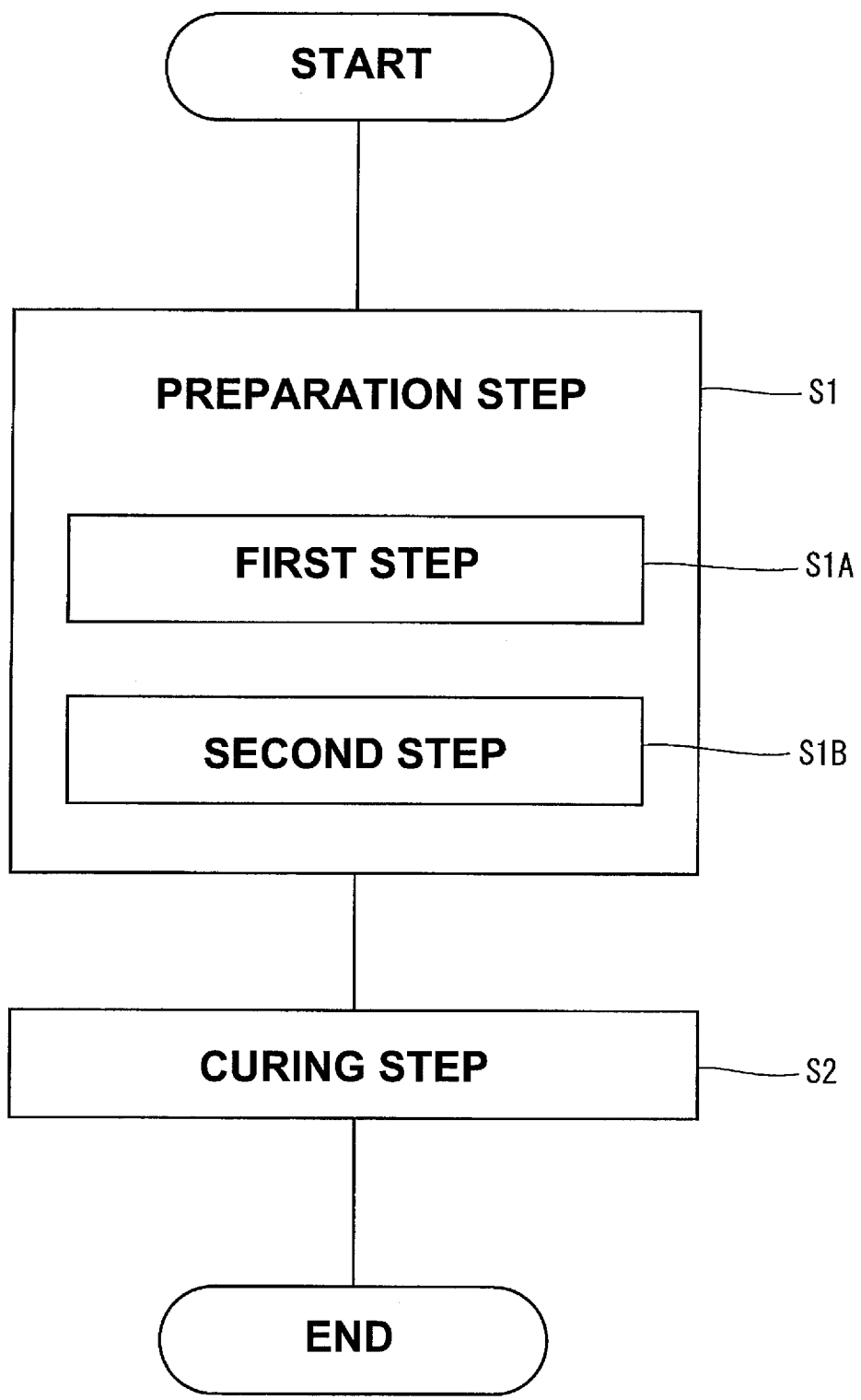
FIG. 2 is a flowchart for explaining the method for manufacturing a spectacle lens according to the first embodiment.

The method for manufacturing a spectacle lens according to this embodiment is executed by preparation step S1 and curing step S2, as shown in the flowchart of FIG. 2. Preparation step S1 is a step for satisfying conditions (coating solution curing conditions) for curing the coating solution 3. The coating solution curing conditions are made up of first step S1A for satisfying the first condition to be described later, and second step S1B for satisfying the second condition to be described later.

Figure 3:
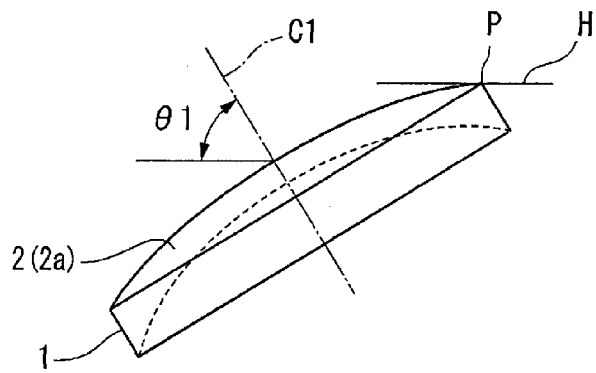
FIG. 3 is a side view showing the spectacle lens substrate inclined so that a convex curved surface is directed obliquely upward.
Figure 4:
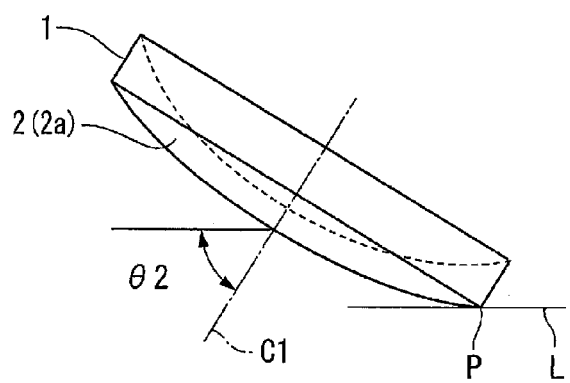
FIG. 4 is a side view showing the spectacle lens substrate inclined so that the convex curved surface is directed obliquely downward.

The first condition is satisfied when the angle of an axis C1 of the spectacle lens substrate 1 with respect to the horizontal direction falls within a predetermined angle range, as shown in FIGS. 3 and 4. The predetermined angle range is a range between an angle θ1 shown in FIG. 3 and an angle θ2 shown in FIG. 4. The angle θ1 shown in FIG. 3 is the maximum inclination angle of the axis C1 when the spectacle lens substrate 1 is inclined clockwise in FIG. 3 (direction in which the lens surface 2 formed from the convex curved surface 2a is directed upward) from a state in which the axis C1 is horizontal, so as to keep a state in which a peripheral edge P of the lens surface 2 is positioned at the highest position H of the lens surface 2.

The angle θ2 shown in FIG. 4 is the maximum inclination angle of the axis C1 when the spectacle lens substrate 1 is inclined counterclockwise in FIG. 4 (direction in which the lens surface 2 formed from the convex curved surface 2a is directed downward) from a state in which the axis is horizontal, so as to keep a state in which the peripheral edge P of the lens surface 2 is positioned at the lowest position L of the lens surface 2.

The second condition is satisfied by rotating the spectacle lens substrate 1 around the axis C1 at a predetermined rotational speed. The rotational speed of the substrate 1 that satisfies the second condition can be, for example, about 15 to 50 RPM in correspondence with the fluidity of the coating solution 3. The rotational speed of the substrate 1 is not limited to the above-mentioned range. When the coating solution 3 is highly fluid, the rotational speed is set to be relatively low. The rotational speed is set to be a speed at which the coating solution 3 does not flow toward the periphery of the lens surface 2 by the centrifugal force.

Figure 5:
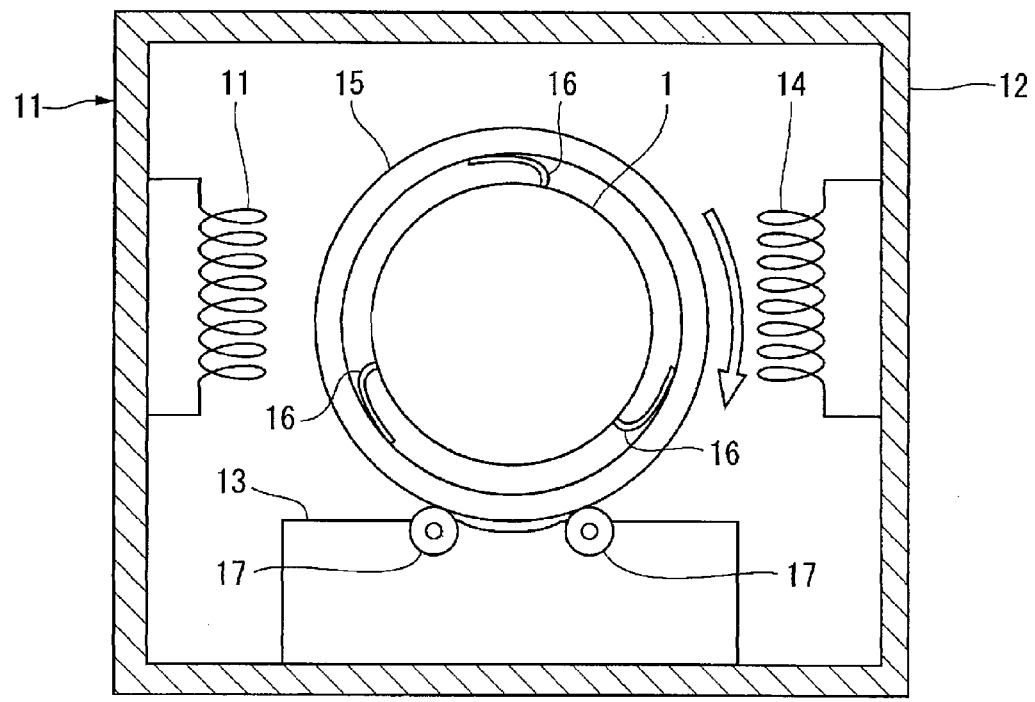
FIG. 5 is a sectional view showing a curing apparatus.

To rotate the spectacle lens substrate 1 at the predetermined rotational speed in a state in which the first condition is satisfied, for example, a curing apparatus 11 shown in FIG. 5 can be used. The curing apparatus 11 includes a curing vessel 12, and a rolling device 13 accommodated in the curing vessel 12. When the coating solution 3 is of a thermosetting type, the curing vessel 12 includes a heater 14. When the coating solution 3 is of an ultraviolet curing type, the curing vessel 12 includes an ultraviolet lamp (not shown).

The rolling device 13 is used to rotate the substrate 1 together with a holder 15. The holder 15 is formed into a cylindrical shape capable of accommodating the substrate 1. A plurality of clamp members 16 sandwich the peripheral surface of the substrate 1 and hold the substrate 1 on a single axis. The holder 15 is placed on two rollers 17 of the rolling device 13 in a state in which the holder 15 stands so that the axis is directed horizontally.

The rollers 17 are driven by a motor (not shown) and rotate at a predetermined rotational speed in the same direction. Along with the rotation of the rollers 17, the substrate 1 rotates together with the holder 15. That is, the curing apparatus 11 can be used to heat the substrate 1 while rotating it longitudinally within the curing vessel 12, and cure the coating solution 3.

When executing the method for manufacturing a spectacle lens according to this embodiment, first, preparation step S1 is executed. In preparation step S1, the substrate 1 is placed on the rolling device 13 of the curing apparatus 11 in a state in which the substrate 1 is held by the holder 15. Then, the substrate 1 is driven to rotate by the rolling device 13. More specifically, the substrate 1 is stood so that the axis C1 becomes horizontal or almost horizontal. Then, the substrate 1 is rotated at a predetermined rotational speed. By rotating the substrate 1 on the rolling device 13 in this manner, first step S1A and second step S1B of preparation step S1 are executed, satisfying the first and second conditions.

After that, curing step S2 is executed. In curing step S2, the coating solution 3 is heated by the heat of the heater 14 in a state in which the substrate 1 is driven to rotate longitudinally by the rolling device 13, as shown in FIG. 5. The heating continues until at least the fluidity of the coating solution 3 is lost.

The direction of gravity acting on the coating solution 3 when curing step S2 is executed alternately changes between the central direction and peripheral direction of the lens along with rotation of the substrate 1. Since the direction in which the gravity acts is not constant, the coating solution 3 does not flow in one direction and stays at the adhesion position though it is fluid. Since the influence of gravity, which is a prime factor of "dripping", can be canceled by longitudinal rotation of the spectacle lens substrate 1, "dripping" of the coating solution 3 flowing along the lens surface 2 does not occur.

According to this embodiment, therefore, the coating solution 3 having normal fluidity can be cured without causing dripping. According to this embodiment, a layer of the coating solution 3 with a thickness of at least 10 μm could be cured to have a uniform thickness on the entire lens surface 2.

Second Embodiment

Figure 6:
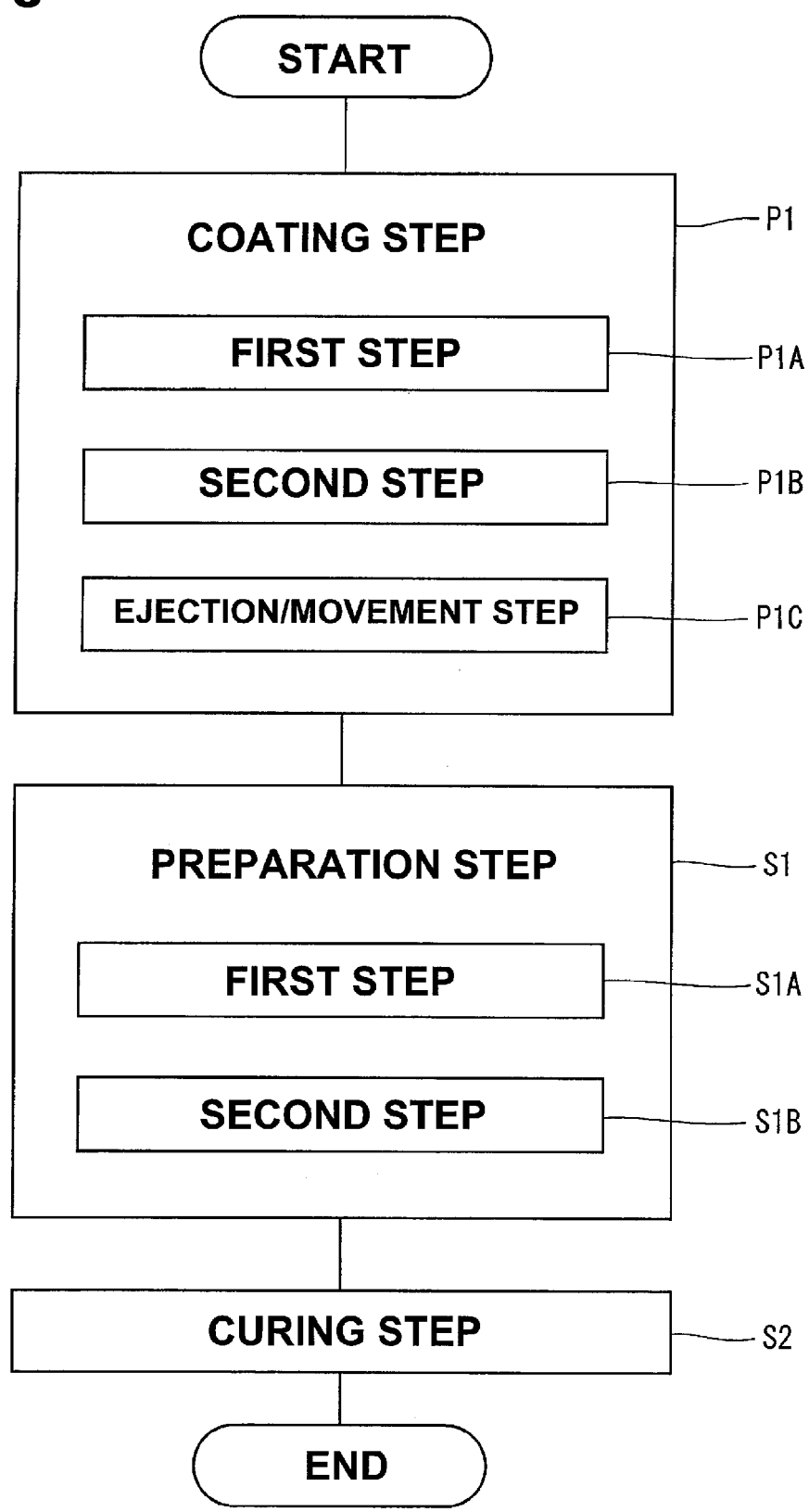
FIG. 6 is a flowchart for explaining a method for manufacturing a spectacle lens according to the second embodiment.
Figure 7:
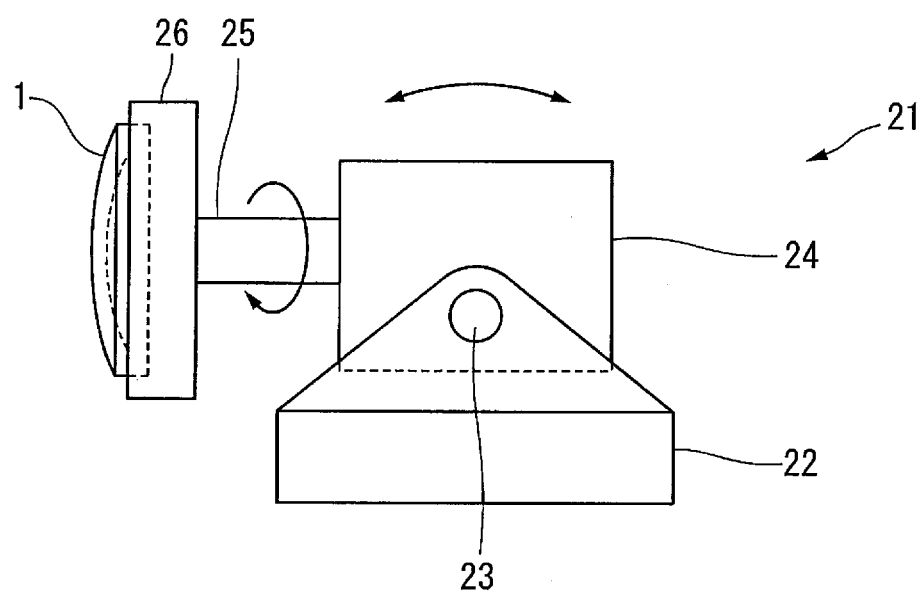
FIG. 7 is a side view showing a rotating apparatus.
Figure 8:
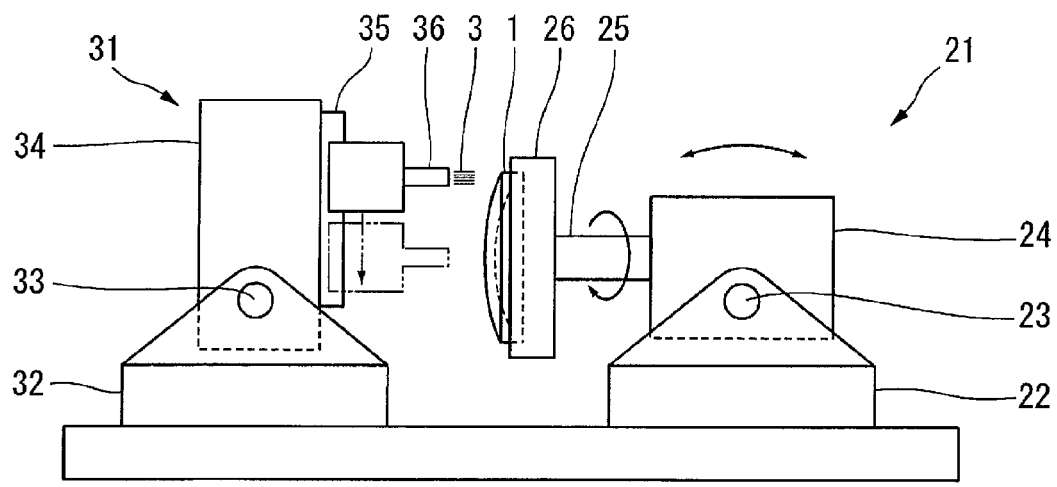
FIG. 8 is a side view showing the rotating apparatus, and a coating apparatus that executes a coating step.

A method for manufacturing an optical lens according to the present invention can execute a coating step before executing a curing step, as shown in FIGS. 6 to 8. In FIGS. 6 to 8, the same reference numerals as those described with reference to FIGS. 1 to 5 denote the same parts, and a detailed description thereof will be omitted properly. A method for manufacturing a spectacle lens according to this embodiment is a method constituting an invention described in claim 2.

To apply a coating solution 3 to a lens surface 2 of a spectacle lens substrate 1 to have a thickness of more than 10 μm, the influence of "dripping" described above needs to be eliminated. The method for manufacturing a spectacle lens according to this embodiment includes coating step P1 that is performed under the same conditions as those of curing step S2 before executing curing step S2 of curing the coating solution 3, as shown in FIG. 6. Coating step P1 is executed by first step P1A that satisfies the first condition, second step P1B that satisfies the second condition, and ejection/movement step P1C. Ejection/movement step P1C is executed by applying the coating solution 3 to the lens surface 2 while rotating the substrate 1 longitudinally at a predetermined rotational speed (about 15 to 50 RPM) in a state in which first step P1A and second step P1B are executed, that is, a state in which the substrate 1 is inclined so that the angle of an axis C1 with respect to the horizontal direction falls within a predetermined angle range.

First step P1A and second step P1B can be executed using a rotating apparatus 21 shown in FIG. 7. The rotating apparatus 21 includes a support table 22, a rotation driving unit 24 that is supported by the support table 22 pivotally via a horizontal support shaft 23, and a holder 26 attached to a rotation shaft 25 of the rotation driving unit 24.

The rotation driving unit 24 is inclined with respect to the support table 22 about the support shaft 23 so that the substrate 1 is inclined at a desired angle. The rotation driving unit 24 rotates the rotation shaft 25 at a predetermined constant rotational speed. The rotational speed can be, for example, about 15 to 50 RPM in correspondence with the fluidity of the coating solution 3. When the coating solution 3 is highly fluid, the rotational speed is set to be relatively low. The rotational speed is set to be a speed at which the coating solution 3 does not flow toward the periphery of the lens surface 2 by the centrifugal force. The holder 26 holds the substrate 1. The holder 26 sandwiches the peripheral surface of the substrate 1 by a plurality of clamp members, and holds the substrate 1 on the same axis as the rotation shaft 25, details of which are not illustrated.

Ejection/movement step P1C is a step of applying the coating solution 3 to the lens surface 2 of the substrate 1. The coating solution 3 is applied to the substrate 1 by a coating apparatus 31 shown in FIG. 8. The coating apparatus 31 includes a support member 32, and a coating unit 34 that is supported by the support member 32 pivotally via a horizontal support shaft 33. The coating unit 34 supports a coating nozzle 36 via a translation mechanism 35. The coating nozzle 36 ejects the coating solution 3, and is driven to move in the radial direction of the substrate 1 by the translation mechanism 35.

The ejection direction of the coating solution 3 can be changed appropriately by inclining the coating unit 34 with respect to the support member 32. More specifically, when the axis C1 of the substrate 1 is not horizontal and is inclined with respect to the horizontal direction, the coating unit 34 is inclined with respect to the support member 32 so as to eject the coating solution 3 with reference to the axis C1 of the substrate 1.

The coating solution 3 is supplied from a supply device (not shown) to the coating nozzle 36. The coating nozzle 36 according to this embodiment ejects small droplets of the coating solution 3 in a constant ejection amount by the spray coat method. The range where the coating nozzle 36 applies the coating solution 3 is narrower than the lens surface 2. The coating nozzle 36 is moved in the radial direction of the substrate 1 by the translation mechanism 35 in a state in which the coating solution 3 is sprayed to the lens surface 2.

That is, the coating solution 3 can be applied to the entire lens surface 2 by moving, in the radial direction of the substrate 1, the range where the coating nozzle 36 applies the coating solution 3 in a state in which the substrate 1 rotates. Although not shown, a coating nozzle that ejects a liquid coating solution 3 can be used as the coating nozzle 36.

The translation mechanism 35 is configured to be able to change the moving speed in accordance with the position of the coating nozzle 36. When the coating nozzle 36 faces the peripheral portion of the substrate 1, the moving speed of the coating nozzle 36 becomes lower than that when the coating nozzle 36 faces the central portion of the substrate 1.

When executing the method for manufacturing a spectacle lens according to this embodiment, first, first step P1A of coating step P1 is executed. In first step P1A, the substrate 1 is mounted on the rotating apparatus 21 and is stood to set the axis C1 at a predetermined inclination angle. At this time, the substrate 1 is stood so that the axis C1 becomes horizontal and the lens surface 2 extends vertically, as shown in, for example, FIG. 7. Thereafter, to execute second step P1B, the substrate 1 is driven to rotate at a predetermined rotational speed by the rotating apparatus 21.

Then, ejection/movement step P1C is executed. In ejection/movement step P1C, as shown in FIG. 8, the coating nozzle 36 is caused to face a convex curved surface 2a or concave curved surface 2b of the lens surface 2 in a state in which the substrate 1 rotates longitudinally, as described above. The coating nozzle 36 ejects the coating solution 3. In this embodiment, droplets of the coating solution 3 are ejected parallel to the axis C1 of the substrate 1 from the coating nozzle 36, and sprayed to the lens surface 2. The coating nozzle 36 according to this embodiment is driven to translate in the radial direction of the substrate 1 from the peripheral portion to central portion of the lens surface 2 by the translation mechanism 35.

Hence, the coating solution 3 is sequentially applied to the substrate 1 during rotation from the peripheral portion toward the central portion. The applied coating solution 3 rotates together with the substrate 1. The direction of gravity acting on the coating solution 3 adhered to the substrate 1 alternately changes between the central direction and peripheral direction of the lens along with rotation of the substrate 1. Since the direction in which the gravity acts is not constant, the coating solution 3 does not flow in one direction and stays at the adhesion position though it is fluid. Since the influence of gravity, which is a prime factor of "dripping", can be canceled by longitudinal rotation of the spectacle lens substrate 1, "dripping" of the coating solution 3 flowing along the lens surface 2 does not occur.

According to this embodiment, therefore, the coating solution 3 having normal fluidity can be applied thick to the lens surface 2 without causing dripping. According to this embodiment, in ejection/movement step P1C, a layer of the coating solution 3 with a thickness of at least 10 μm could be formed to have a uniform thickness on the entire lens surface 2. When a coating solution for forming a hard coat film is used as the coating solution 3, a hard coat film is formed on the substrate 1 at a film thickness of at least 10 μm. A spectacle lens having a hard coat film of such a thickness is much higher in scratch resistance than a conventional spectacle lens. In addition, interference fringes are reduced.

Note that the coating apparatus 31 shown in FIG. 8 is so illustrated that the coating nozzle 36 moves from top to bottom, but the present invention is not limited to this. That is, the same effects as those described above can be obtained even when the coating nozzle 36 moves from the lower end side to upper side (center side) of the lens surface 2 or the coating nozzle 36 moves horizontally.

Coating step P1 ends after rotation of the substrate 1 continues by a predetermined time while maintaining a state in which the first and second conditions are satisfied even after the end of applying the coating solution 3. The time during which rotation of the substrate 1 continues is the time by which the fluidity of the coating solution 3 is lost to a degree at which the coating solution 3 applied to the substrate 1 does not move on the substrate 1. A coating solution 3 containing a volatile solvent increases in viscosity and decreases in fluidity when part of the solvent evaporates after application. An ultraviolet curing coating solution 3 increases in viscosity and decreases in fluidity upon irradiation with ultraviolet rays contained in the illumination in a coating environment. That is, in this embodiment, rotation of the substrate 1 stops after the fluidity of the coating solution 3 becomes low so that the coating solution 3 does not move on the substrate 1. Thus, next preparation step S1 can be executed in a state in which the coating solution 3 applied thick is held on the substrate 1 and so-called "dripping" does not occur.

This embodiment has described an example in which coating step P1 ends by stopping rotation of the substrate 1 after the fluidity of the coating solution 3 decreases. However, coating step P1 can be ended in a state in which the substrate 1 rotates. In this case, coating step P1 ends in a state in which the substrate 1 rotates, and next preparation step S1 and curing step S2 are executed in this state. This method can be implemented by, for example, moving the rotating apparatus 21 between the coating apparatus 31, and a curing apparatus (not shown) including a heater or ultraviolet lamp for curing the coating solution 3. More specifically, the substrate 1 is transferred from the rotating apparatus 21 to the curing apparatus while it is driven to rotate by the rotating apparatus 21.

Third Embodiment

Figure 9:
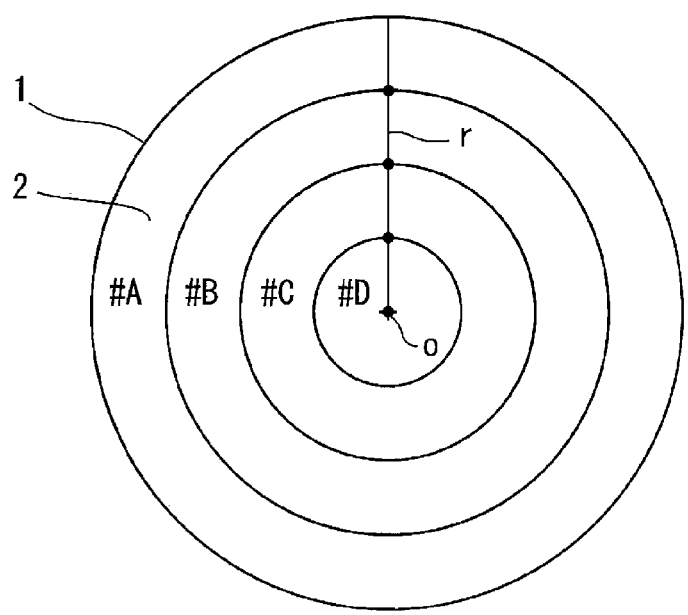
FIG. 9 is a front view showing a lens surface for explaining a plurality of coating regions according to the third embodiment.
Figure 10:
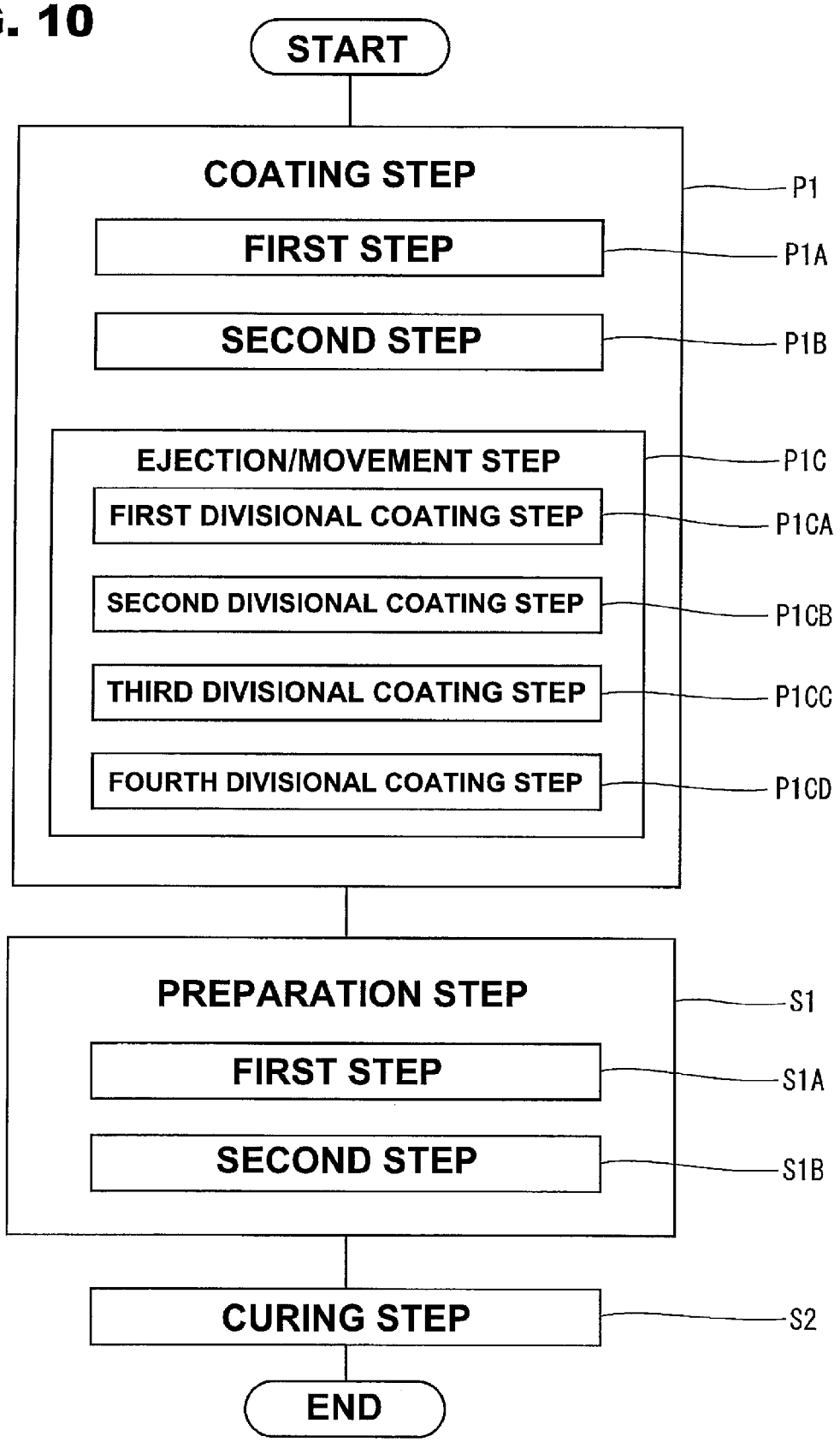
FIG. 10 is a flowchart for explaining a method for manufacturing a spectacle lens according to the third embodiment.

A coating solution can be applied by changing settings for respective coating regions, as shown in FIGS. 9 and 10. In this embodiment, the same reference numerals as those described with reference to FIGS. 1 to 8 denote the same parts, and a detailed description thereof will be omitted properly.

FIG. 9 is a front view showing a lens surface for explaining another embodiment of coating step P1. FIG. 10 is a flowchart for explaining a method for manufacturing a spectacle lens according to this embodiment. The method for manufacturing a spectacle lens according to this embodiment is a method constituting an invention described in claim 3.

The method for manufacturing a spectacle lens according to this embodiment is, for example, a method for executing coating step P1 capable of more uniformly applying a coating solution 3, before executing preparation step S1, as shown in FIG. 10.

Coating step P1 is made up of first step P1A, second step P1B, and ejection/movement step P1C including first to fourth divisional coating steps P1CA to P1CD to be described later.

Ejection/movement step P1C according to this embodiment is performed by changing a parameter regarding coating for respective coating regions #A to #D shown in FIG. 9. When applying the coating solution 3 in the respective coating regions #A to #D, the coating solution 3 is applied by the same method as that when the above-described second embodiment is adopted. More specifically, a coating nozzle 36 sprays droplets of the coating solution 3 in a predetermined amount to a target coating position at part of a lens surface 2. In addition, the target coating position is moved in the radial direction of the lens surface 2. The coating nozzle 36 according to this embodiment translates from the periphery to center of the lens surface 2 (a convex curved surface 2a or a concave curved surface 2b).

In this embodiment, the parameter which is changed in regard to coating is the moving speed of the coating nozzle 36. This moving speed is set for the respective coating regions #A to #D shown in FIG. 9. The plurality of coating regions #A to #D shown in FIG. 9 are formed by dividing a radius r from a center O to periphery of the lens surface 2 by every predetermined interval, and dividing the lens surface 2 by circles passing through the respective division points. The center of each circle passing through each division point coincides with the center of the lens surface 2. That is, the coating regions #A to #D are formed by dividing the lens surface 2 into a plurality of concentric circles.

The moving speed of the coating nozzle 36 is set based on the areas of the coating regions #A to #D. The moving speed decreases as the area increases. That is, the moving speed becomes lowest when the coating solution 3 is applied to the first coating region #A including the peripheral edge of the lens surface 2, and increases when the coating solution 3 is applied to the second coating region #B positioned inside the first coating region #A in the radial direction. For this reason, the moving speed becomes higher when coating the third coating region #C than when coating the second coating region #B, and higher when coating the fourth coating region #D than when coating the third coating region #C. The coating nozzle 36 moves at a constant speed when applying the coating solution 3 within the same coating region.

As shown in FIG. 10, ejection/movement step P1C according to this embodiment is executed by first to fourth divisional coating steps P1CA to P1CD. First divisional coating step P1CA is a step of applying the coating solution 3 to the first coating region #A positioned on the outermost peripheral side out of the first to fourth coating regions #A to #D. The moving speed of the coating nozzle 36 at this time is set to be a speed (lowest speed) corresponding to the area of the first coating region #A.

After the end of application up to the inner peripheral end of the first coating region #A, the coating solution 3 is applied to the second coating region #B in second divisional coating step P1CB. After applying the coating solution 3 to the second coating region #B, the process advances from third divisional coating step P1CC to fourth divisional coating step P1CD. The coating nozzle 36 moves at moving speeds corresponding to areas to apply the coating solution 3 to even the third and fourth coating regions #C and #D.

According to this embodiment, the coating solution 3 is applied in ejection/movement step P1C so that the adhesion amount of the coating solution 3 per unit area becomes a predetermined amount on the entire lens surface 2. The coating solution 3 can therefore be applied to have a uniform film thickness on the entire lens surface 2. In particular, the adhesion amount of the coating solution 3 can be controlled based on the area of the lens surface 2, so the control of the adhesion amount can be simplified. In this embodiment, when dividing the lens surface 2 into the plurality of coating regions #A to #D, the radius of the lens surface 2 is divided at equal intervals, and the lens surface 2 is divided by circles passing through the division points. Thus, the areas of the coating regions #A to #D can be calculated easily.

Note that the above-described "parameter that is changed in regard to coating" is not limited to the moving speed of the coating nozzle 36, and may be, for example, the ejection amount of the coating solution 3 ejected from the coating nozzle 36 or both the moving speed and ejection amount. When changing the ejection amount of the coating solution 3, for example, the moving speed of the coating nozzle 36 is kept constant, and the ejection amount of the coating solution 3 is maximized at the time of coating the first coating region #A. In this case, when applying the coating solution 3 to the second to fourth coating regions #B to #D, the ejection amount of the coating solution 3 is desirably decreased in the order named.

Fourth Embodiment

Figure 11:
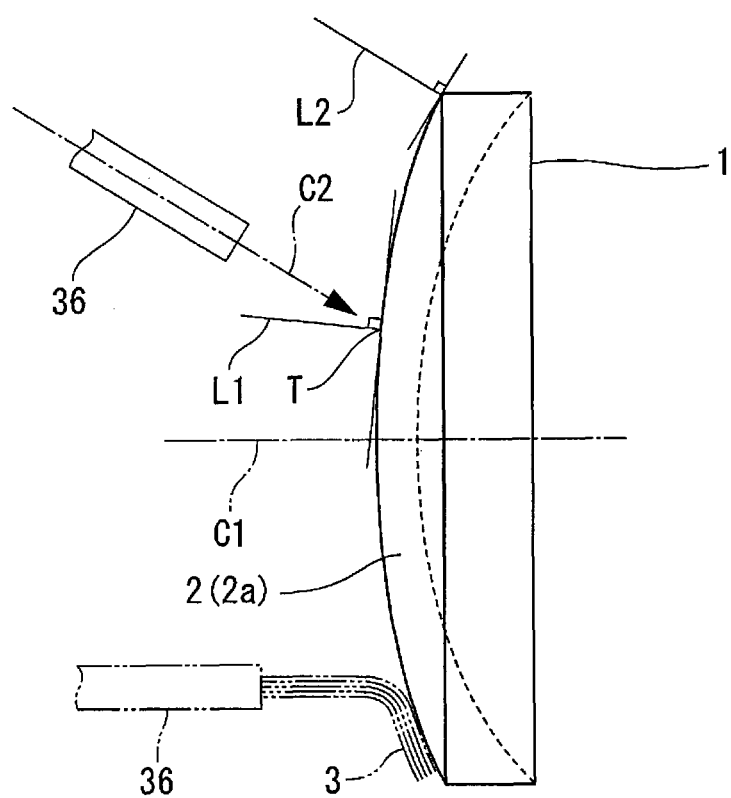
FIG. 11 is a side view showing a spectacle lens substrate and a coating nozzle for explaining the coating direction according to the fourth embodiment.
Figure 12:
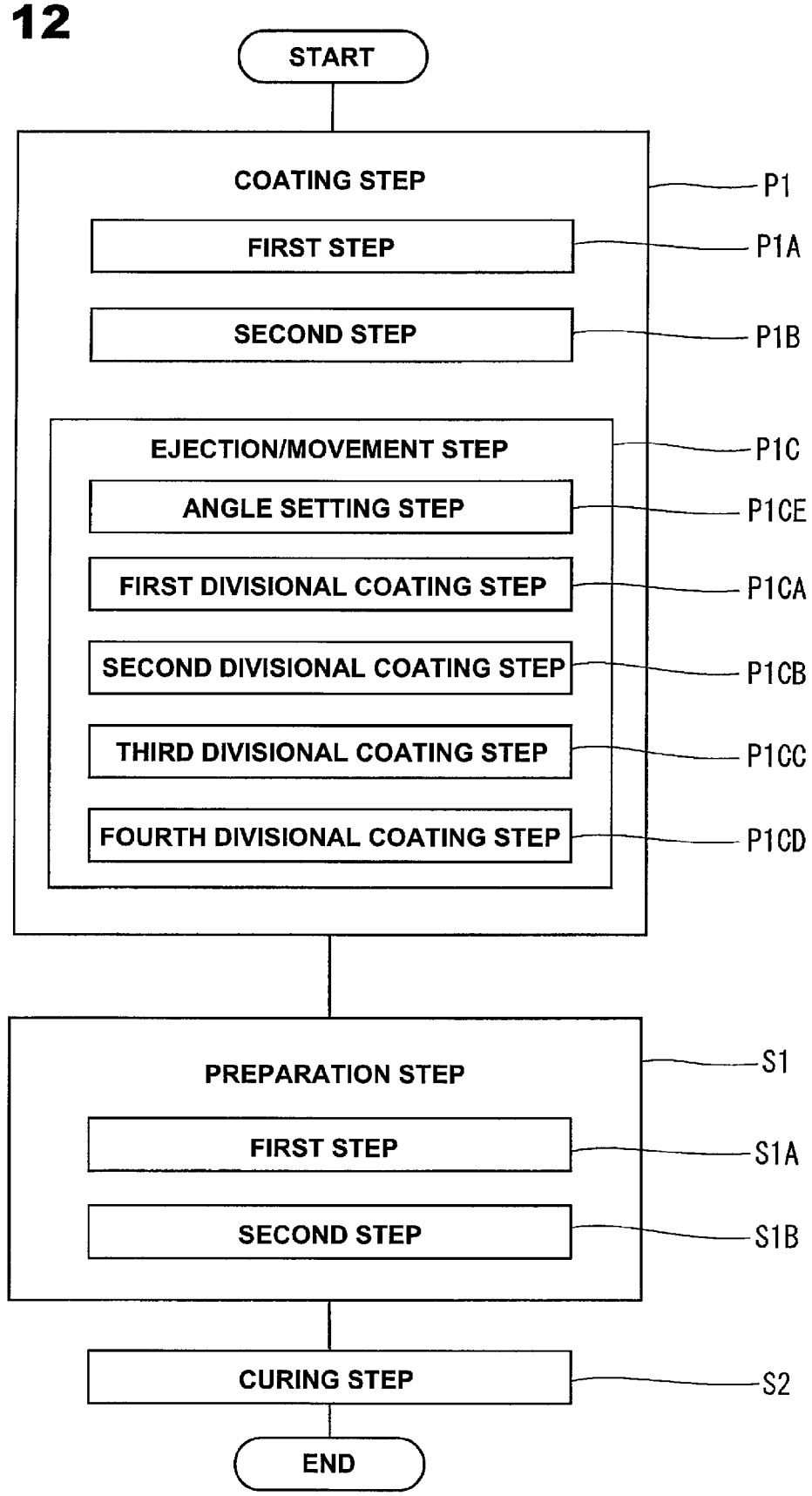
FIG. 12 is a flowchart for explaining a method for manufacturing a spectacle lens according to the fourth embodiment.

The direction in which a coating solution is applied in a coating step can be a direction inclined with respect to the axis of a substrate. This embodiment will be described in detail with reference to FIGS. 11 and 12. In FIGS. 11 and 12, the same reference numerals as those described with reference to FIGS. 1 to 10 denote the same parts, and a detailed description thereof will be omitted properly.

In a substrate 1 shown in FIG. 11, the curvature of a lens surface 2 (a convex curved surface 2a) relatively increases. When a coating solution 3 is sprayed parallel to the axial direction of the substrate 1 to the lens surface 2 having a large curvature, droplets of the coating solution 3 are adhered to the lens surface 2 at the peripheral portion of the lens surface 2 while flowing toward the peripheral edge, as indicated by a chain double-dashed line in FIG. 11. As a result, the thickness of the coating solution 3 applied to the central portion of the lens surface 2 becomes smaller than that of the coating solution 3 applied at the peripheral portion.

In this embodiment, the coating solution 3 is obliquely applied to the lens surface 2 so that the coating solution 3 flows toward the center of the lens surface 2 to cancel the above-described problem. The coating direction of the coating solution 3 according to this embodiment is a direction toward a target coating position T on a side opposite to an axis C1 of the substrate 1 with respect to a normal L1 passing through the target coating position T of the lens surface 2, as shown in FIG. 11. A center line C2 of a coating nozzle 36 according to this embodiment is almost parallel to a normal L2 at the peripheral edge of the lens surface 2 on a virtual plane including the axis C1 of the substrate 1 and the normal L1, as shown in FIG. 11.

In a method for manufacturing a spectacle lens according to this embodiment, ejection/movement step P1C of coating step P1 is executed by angle setting step P1CE, and first to fourth divisional coating steps P1CA to P1CD, as shown in the flowchart of FIG. 12. First to fourth divisional coating steps P1CA to P1CD are the same as the steps described in the third embodiment. Angle setting step P1CE is a step of setting the coating direction of the coating nozzle 36 to be inclined with respect to the lens surface 2, as described above. By executing angle setting step P1CE, the coating nozzle 36 is directed to the target coating position T from a side opposite to the axis C1 of the substrate 1 with respect to the normal L1 passing through the target coating position T of the lens surface 2.

In ejection/movement step P1C, the coating solution 3 is applied to the entire lens surface 2 in first to fourth divisional coating steps P1CA to P1CD after setting the angle of the coating nozzle 36 in angle setting step P1CE. In first to fourth divisional coating steps P1CA to P1CD, the coating solution 3 is obliquely applied toward the center of the lens surface 2, so the coating solution 3 applied to the lens surface 2 can be prevented from flowing toward the periphery of the lens surface 2.

According to this embodiment, the coating solution 3 is not applied relatively thick to the peripheral portion of the lens surface 2 owing to dripping, and the film thickness distribution of the lens surface 2 is uniformed. Note that the spray direction of the coating nozzle 36 may be changed in correspondence with the curvature of the target coating position T at the time of translation. With this arrangement, the coating solution 3 can be applied so that the amount in which the coating solution 3 flows toward the center of the lens surface 2 becomes uniform. Therefore, the film thickness distribution is uniformed at high accuracy.

This embodiment has described an example in which, when applying the coating solution 3 in ejection/movement step P1C, the lens surface 2 is divided into a plurality of coating regions and the moving speed of the coating nozzle 36 is changed for the respective coating regions. However, it is also possible to keep a constant moving speed of the coating nozzle 36 throughout all coating regions, change the ejection amount of the coating solution 3 for the respective coating regions, and apply the coating solution 3.

The above-described second to fourth embodiments have explained an example in which the coating solution 3 is sprayed and applied in the state of droplets or liquid. However, the present invention is not limited to this. That is, it is also possible to dip the spectacle lens substrate 1 in, for example, a bath containing the coating solution 3, and form a layer of the coating solution 3 on the lens surface 2 by a so-called dipping method.

To form, for example, a hard coat film on the spectacle lens substrate 1, the coating solution 3 is applied to either one of the convex curved surface 2a and concave curved surface 2b of the lens surfaces 2, and subsequently applied to the other one of the convex curved surface 2a and concave curved surface 2b of the lens surfaces 2. After that, the coating solution 3 applied to the two curved surfaces of the lens surfaces 2 is cured to a degree at which fluidity is lost. By employing this method, the coating solution 3 applied to the two, convex curved surface 2a and concave curved surface 2b can be cured efficiently. Also, by employing this method, for example, when application of the coating solution 3 to the convex curved surface 2a has ended and the coating solution 3 is applied to the concave curved surface 2b, even if a droplet of the coating solution 3 moves around to the convex curved surface 2a and is adhered to the convex curved surface 2a, this droplet is absorbed in a coating film on the convex curved surface 2a, keeping a good outer appearance. The method for manufacturing an optical lens according to the present invention is applicable when performing application of the coating solution 3 to the convex curved surface 2a, application of the coating solution 3 to the concave curved surface 2b, and curing of the coating solution 3 applied to the convex curved surface 2a and the concave curved surface 2b.

Application of the coating solution 3 to the two lens surfaces 2, and curing of it can also be performed for every lens surface 2. In this case, the coating solution 3 is applied to either one of the convex curved surface 2a and concave curved surface 2b of the lens surfaces 2, and is cured to a degree at which fluidity is lost. After that, the coating solution 3 is applied to the other one of the convex curved surface 2a and concave curved surface 2b of the lens surfaces 2, and is cured. Even in this case, the present invention is applicable when performing application of the coating solution 3 to the respective lens surfaces 2 and curing of the coating solution 3 applied to the two lens surfaces 2.

Note that the implementation of the present invention is not limited to the method explained in each of the above-described embodiments, but can be appropriately changed. The above-described embodiments have explained an example in which a film such as a hard coat film or a photochromic film is formed on the spectacle lens substrate 1. However, the present invention is applicable to even another optical lens different from a spectacle lens.

EXPLANATION OF THE REFERENCE NUMERALS AND SIGNS

1 . . . spectacle lens substrate, 2 . . . lens surface, 2a . . . convex curved surface, 2b . . . concave curved surface, $\theta1$, $\theta2$ . . . angle, H . . . high position, P . . . peripheral edge, T . . . target coating position, L1 . . . normal

The invention claimed is:

1. A method for manufacturing an optical lens, comprising the steps of:
obtaining a first maximum inclination angle and a second maximum inclination angle of an axis of an optical lens substrate, the first maximum inclination angle being a maximum inclination angle in which a peripheral edge of a lens surface of the optical lens substrate remains positioned at the highest position of the lens surface when the optical lens substrate is inclined, from the position in which the axis is horizontal, in the direction in which the lens surface formed from a convex curved surface is directed upward, and the second maximum inclination angle being a maximum inclination angle in which the peripheral edge of the lens surface remains positioned at the lowest position of the lens surface when the optical lens substrate is inclined, from the position in which the axis is horizontal, in the direction in which the lens surface formed from the convex curved surface is directed downward;
as a first curing condition, setting an angle of the axis of the optical lens substrate with respect to a horizontal direction within an angle range between the first maximum inclination angle and the second maximum inclination angle;
as a second curing condition, rotating the optical lens substrate around the axis at a rotational speed of 15 to 50 RPM at which a coating solution on the lens surface of the optical lens substrate is held in a coating position; and
when the first curing condition and the second curing condition are satisfied, curing the coating solution applied to the lens surface of the optical lens substrate; and
coating the coating solution onto the lens surface of the optical lens substrate by a spray coat method before the curing step.

2. The method for manufacturing an optical lens according to claim 1, wherein the coating solution is applied to the lens surface to have a thickness of about 10 μm or more.

3. The method for manufacturing an optical lens according to claim 1, wherein the rotational speed is set to be a speed at which the coating solution does not flow toward the peripheral edge of the lens surface by centrifugal force.

4. The method for manufacturing an optical lens according to claim 1, wherein the coating step includes a step of coating in a state in which the first condition and the second condition are satisfied.

5. The method for manufacturing an optical lens according to claim 4, wherein the coating solution is applied to the lens surface to have a thickness of about 10 μm or more.

6. The method for manufacturing an optical lens according to claim 4, wherein the rotational speed is set to be a speed at which the coating solution does not flow toward the peripheral edge of the lens surface by centrifugal force.

7. The method for manufacturing an optical lens according to claim 4, wherein the coating step includes a step of spraying a droplet of the coating solution to a target coating position moving between a peripheral portion and central portion of the lens surface so as to set an adhesion amount of the coating solution per unit area to be a predetermined amount on the entire lens surface of the optical lens substrate.

8. The method for manufacturing an optical lens according to claim 7, wherein the coating solution is applied to the lens surface to have a thickness of about 10 μm or more.

9. The method for manufacturing an optical lens according to claim 7, wherein the rotational speed is set to be a speed at which the coating solution does not flow toward the peripheral edge of the lens surface by centrifugal force.

10. The method for manufacturing an optical lens according to claim 7, wherein the coating step includes a step of, when applying a droplet of the coating solution to a lens surface formed from a convex curved surface, applying the droplet of the coating solution in a direction toward the target coating position on a side opposite to the axis of the optical lens substrate with respect to a normal passing through the target coating position of the lens surface of the optical lens substrate.

11. The method for manufacturing an optical lens according to claim 10, wherein the coating solution is applied to the lens surface to have a thickness of about 10 μm or more.

12. The method for manufacturing an optical lens according to claim 10, wherein the rotational speed is set to be a speed at which the coating solution does not flow toward the peripheral edge of the lens surface by centrifugal force.

* * * * *